United States Patent
Yamauchi

(10) Patent No.: US 11,387,455 B2
(45) Date of Patent: *Jul. 12, 2022

(54) POSITIVE ELECTRODE ACTIVE MATERIAL FOR SODIUM ION SECONDARY BATTERY

(71) Applicant: NIPPON ELECTRIC GLASS CO., LTD., Otsu (JP)

(72) Inventor: Hideo Yamauchi, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 210 days.

This patent is subject to a terminal disclaimer.

(21) Appl. No.: 16/474,342

(22) PCT Filed: Mar. 23, 2018

(86) PCT No.: PCT/JP2018/011579
§ 371 (c)(1),
(2) Date: Jun. 27, 2019

(87) PCT Pub. No.: WO2018/198617
PCT Pub. Date: Nov. 1, 2018

(65) Prior Publication Data
US 2019/0341611 A1 Nov. 7, 2019

(30) Foreign Application Priority Data

Apr. 27, 2017 (JP) ............................. JP2017-088227

(51) Int. Cl.
| | | |
|---|---|---|
| H01M 4/525 | (2010.01) | |
| H01M 4/137 | (2010.01) | |
| H01M 4/36 | (2006.01) | |
| H01M 4/505 | (2010.01) | |
| H01M 4/58 | (2010.01) | |
| H01M 4/62 | (2006.01) | |
| H01M 10/054 | (2010.01) | |
| H01M 4/02 | (2006.01) | |

(52) U.S. Cl.
CPC .......... *H01M 4/525* (2013.01); *H01M 4/137* (2013.01); *H01M 4/364* (2013.01); *H01M 4/505* (2013.01); *H01M 4/58* (2013.01); *H01M 4/621* (2013.01); *H01M 10/054* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 10,135,068 | B2 * | 11/2018 | Honma | H01M 4/5825 |
| 2004/0206938 | A1 | 10/2004 | Barker et al. | |
| 2005/0136331 | A1 | 6/2005 | Jouanneau-Si Larbi et al. | |
| 2006/0091363 | A1 | 5/2006 | Barker et al. | |
| 2012/0199785 | A1 | 8/2012 | Saka | |
| 2012/0276438 | A1 | 11/2012 | Saka et al. | |
| 2014/0197358 | A1 | 7/2014 | Nose | |
| 2015/0303470 | A1 | 10/2015 | Honma et al. | |
| 2016/0072128 | A1 | 3/2016 | Pasta et al. | |
| 2016/0118695 | A1 | 4/2016 | Lee et al. | |
| 2017/0005337 | A1 | 1/2017 | Ikejiri et al. | |
| 2017/0346094 | A1 | 11/2017 | Yamauchi | |

FOREIGN PATENT DOCUMENTS

| | | |
|---|---|---|
| CN | 1780788 A | 5/2006 |
| CN | 102089239 A | 6/2011 |
| CN | 102574687 A | 7/2012 |
| CN | 103765640 A | 4/2014 |
| CN | 104247103 A | 12/2014 |
| CN | 105637694 A | 6/2016 |
| CN | 105836724 A | 8/2016 |
| CN | 106450295 A | 2/2017 |
| CN | 106537667 A | 3/2017 |
| EP | 0 078 692 A1 | 5/1983 |
| EP | 2 301 890 A1 | 3/2011 |
| JP | 2005-183395 A | 7/2005 |
| JP | 2006-523930 A | 10/2006 |
| JP | 2015-026483 * | 2/2015 |
| JP | 5673836 B2 | 2/2015 |
| WO | 2013/133369 A1 | 9/2013 |
| WO | 2016/072315 A1 | 5/2016 |
| WO | 2016/084573 A1 | 6/2016 |

OTHER PUBLICATIONS

Official Communication issued in International Patent Application No. PCT/JP2018/011579, dated Jun. 5, 2018.
Honma et al., "Fabrication of Na2FeP2O7 glass-ceramics for sodium ion battery", Journal of the Ceramic Society of Japan, 120 [8], 2012, pp. 344-346.
Official Communication issued in corresponding European Patent Application No. 18791622.6, dated Dec. 17, 2020.
Xiang et al., "Recent Advances and Prospects of Cathode Materials for Sodium-Ion Batteries", Advanced Materials, vol. 27 No 36, Sep. 1, 2015, pp. 5343-5364.
Official Communication issued in corresponding Chinese Patent Application No. 201880027065.1, dated Nov. 23, 2021.

* cited by examiner

*Primary Examiner* — Laura Weiner
(74) *Attorney, Agent, or Firm* — Keating and Bennett, LLP

(57) ABSTRACT

Provided is a Ni-based positive electrode active material for a sodium ion secondary battery having an excellent discharge capacity. A positive electrode active material for a sodium ion secondary battery, the positive electrode active material being composed of crystals represented by a general formula $Na_x (Ni_{1-a}M_a)_y P_2 O_z$ (where M represents at least one transition metal element selected from the group consisting of Fe, Cr, Mn, and Co and the following are satisfied: $0.6 \leq x \leq 4$, $0.3 \leq y \leq 2.7$, $0 \leq a \leq 0.9$, and $6 \leq z < 7.5$).

8 Claims, No Drawings

POSITIVE ELECTRODE ACTIVE MATERIAL FOR SODIUM ION SECONDARY BATTERY

TECHNICAL FIELD

The present invention relates to positive electrode active materials for sodium ion batteries used in portable electronic devices, electric vehicles, and so on.

BACKGROUND ART

Lithium ion secondary batteries have secured their place as high-capacity and light-weight power sources essential for mobile electronic terminals, electric vehicles, and so on and attention has been focused, as their positive electrode active materials, on active materials containing olivine crystals represented by the general formula $LiFePO_4$. However, as for lithium, there are concerns about such issues as a global rise in raw material prices and, therefore, studies have recently been conducted on sodium ion secondary batteries, such as $Na_2FeP_2O_7$ crystals, in which sodium is used as an alternative to lithium (see, for example, Non-Patent Literature 1).

And yet, Fe-based crystals, such as $Na_2FeP_2O_7$ crystals, have a problem in that their operating voltage is generally as low as 3V or less. Meanwhile, Ni-based positive electrode active materials, such as $Na_4Ni_3(PO_4)_2(P_2O_7)$ crystals and $NaNiPO_4$ crystals, are also known. These Ni-based positive electrode active materials have an operating voltage as high as 5 V and, therefore, can increase energy density (see, for example, Patent Literature 1).

CITATION LIST

Patent Literature

[PTL 1]
Japanese Patent No. 5673836

Non-Patent Literature

[NPTL 1]
Journal of the Ceramic Society of Japan 120 [8] 344-346 2012

SUMMARY OF INVENTION

Technical Problem

For the above Ni-based positive electrode active materials, oxygen desorption from the active materials is likely to progress in the oxidation reaction of $Ni^{2+} \rightarrow Ni^{3+}$ during the first charge, so that the reduction reaction of $Ni^{3+} \rightarrow Ni^{2+}$ does not occur during discharge. Therefore, the Ni-based positive electrode active materials have a problem in that the discharge capacity is eventually low. Furthermore, when such a Ni-based positive electrode active material as described above is applied to an all-solid-state battery, a Na ion-conducting path is difficult to form between the active material and the solid electrolyte. Therefore, the above Ni-based positive electrode active materials have a problem in that the discharge capacity is eventually low.

In view of the above situations, the present invention has an object of providing a Ni-based positive electrode active material for a sodium ion secondary battery having an excellent discharge capacity.

Solution to Problem

The inventor has found from intensive studies that the above problem can be solved by a positive electrode active material of a particular composition containing a Ni component and proposes the positive electrode active material as the present invention.

Specifically, a positive electrode active material for a sodium ion secondary battery according to the present invention is composed of crystals represented by a general formula $Na_x(Ni_{1-a}M_a)_yP_2O_z$ (where M represents at least one transition metal element selected from the group consisting of Fe, Cr, Mn, and Co and the following are satisfied: $0.6 \leq x \leq 4$, $0.3 \leq y \leq 2.7$, $0 \leq a \leq 0.9$, and $6 \leq z < 7.5$). With the above crystals, phosphoric acid forming the skeletons of the crystals is mainly pyrophosphoric acid ($P_2O_7$) or metaphosphoric acid ($PO_3$) and, therefore, oxygen desorption from the active material is less likely to progress in the oxidation reaction of $Ni^{2+} \rightarrow Ni^{3+}$ during the first charge. Hence, the reduction reaction of $Ni^{3+} \rightarrow Ni^{2+}$ is likely to occur during discharge and, eventually, the discharge capacity is likely to be high. Furthermore, when the above active material is applied to an all-solid-state battery, a Na ion-conducting path is likely to be formed between the active material and the solid electrolyte, so that the discharge capacity is likely to increase.

Note that the positive electrode active material according to the present invention is basically composed only of crystals and has a structure free of amorphous phase. This offers an advantage that the redox potential during charge and discharge is likely to be held constant at a high potential, so that the energy density is likely to increase.

In the positive electrode active material for a sodium ion secondary battery according to the present invention, the crystals preferably have a structure belonging to a triclinic space group P1 or P-1.

In the positive electrode active material for a sodium ion secondary battery according to the present invention, the crystals preferably have a structure belonging to a monoclinic space group P21/c or Cm.

In the positive electrode active material for a sodium ion secondary battery according to the present invention, the crystals preferably have a structure belonging to an orthorhombic space group Pcca.

A positive electrode material for a sodium ion secondary battery according to the present invention contains the above-described positive electrode active material for a sodium ion secondary battery.

The positive electrode material for a sodium ion secondary battery according to the present invention may contain a sodium ion-conductive solid electrolyte.

In the positive electrode material for a sodium ion secondary battery according to the present invention, the sodium ion-conductive solid electrolyte preferably contains beta-alumina or NASICON crystals.

The positive electrode material for a sodium ion secondary battery according to the present invention preferably contains, in % by mass, 30 to 100% the positive electrode active material for a sodium ion secondary battery, 0 to 70% the sodium ion-conductive solid electrolyte, and 0 to 20% conductive agent.

In a positive electrode for a sodium ion secondary battery according to the present invention, the above-described positive electrode material for a sodium ion secondary battery is used.

A sodium ion secondary battery according to the present invention includes the above-described positive electrode for a sodium ion secondary battery.

Advantageous Effects of Invention

The present invention enables provision of a Ni-based positive electrode active material for a sodium ion secondary battery having an excellent discharge capacity.

DESCRIPTION OF EMBODIMENTS (Positive Electrode Active Material for Sodium Ion Secondary Battery)

A positive electrode active material for a sodium ion secondary battery according to the present invention is composed of crystals represented by a general formula $Na_x(Ni_{1-a}M_a)_yP_2O_z$ (where M represents at least one transition metal element selected from the group consisting of Fe, Cr, Mn, and Co and the following are satisfied: $0.6 \leq x \leq 4$, $0.3 \leq y \leq 2.7$, $0 \leq a \leq 0.9$, and $6 \leq z < 7.5$). Reasons why the crystal composition is defined as just described will be described below.

Na serves as a supply source of sodium ions that, during charge and discharge, move between the positive electrode active material and a negative electrode active material. The range of x is $0.6 \leq x \leq 4$, preferably $0.7 \leq x \leq 2$, and particularly preferably $1 \leq x \leq 1.9$. If x is too small, the amount of sodium ions involved in charge and discharge becomes small, so that the discharge capacity is less likely to decrease. On the other hand, if x is too large, crystals not involved in charge and discharge, such as $Na_3PO_4$, precipitate, so that the discharge capacity is likely to decrease.

Transition metals, Ni and M, change their valences during charge and discharge to cause a redox reaction and thus act as drive forces for insertion and extraction of sodium ions. The range of y is $0.3 \leq y \leq 2.7$, preferably $0.4 \leq y \leq 2$, and particularly preferably $0.7 \leq y \leq 1.3$. If y is too small, the amount of transition metal elements involved in charge and discharge becomes small, so that the discharge capacity is less likely to decrease. On the other hand, if y is too large, NiO crystals and other crystals not involved in charge and discharge precipitate, so that the discharge capacity is likely to decrease.

The range of a is $0 \leq a \leq 0.9$, preferably $0 \leq a \leq 0.5$, more preferably $0 \leq z \leq 0.3$, and particularly preferably $a=0$. As a is smaller, the redox potential becomes higher, so that the operating voltage of the battery tends to become higher.

M is at least one transition metal element selected from the group consisting of Fe, Cr, Mn, and Co, but among them Co and Mn are preferred because they have a high operating voltage. Furthermore, Fe is preferred because it has high structural stability during charge and discharge and therefore improves the cycle characteristics.

$P_2O_z$ forms a three-dimensional network and, therefore, has the effect of stabilizing the structure of the positive electrode active material. The range of z is $6 \leq z < 7.5$, preferably $6.3 \leq z \leq 7.3$, and particularly preferably $6.7 \leq z \leq 7$. If z is too small, the amount of phosphoric acid component not involved in charge and discharge increases, so that the discharge capacity is likely to decrease. On the other hand, if z is too large, the skeletal component forming the crystal structure mainly becomes orthophosphoric acid ($PO_4$). Therefore, oxygen desorption is likely to occur in the redox reaction of Ni during charge and discharge and, eventually, the discharge capacity is likely to decrease.

Note that x/y is preferably 0.4 to 10, more preferably 1.35 to 2, and particularly preferably 1.4 to 1.9. If x/y is too small or too large, the discharge capacity tends to decrease.

The crystals represented by the general formula $Na_x(Ni_{1-a}M_a)_yP_2O_z$ preferably have any one crystal structure of triclinic, monoclinic, and orthorhombic crystal structures. More specifically, the crystals represented by the general formula $Na_x(Ni_{1-a}M_a)_yP_2O_z$ preferably have a structure belonging to a triclinic space group P1 or P-1, a structure belonging to a monoclinic space group P21/c or Cm, or a structure belonging to an orthorhombic space group Pcca. Among them, a structure belonging to a triclinic space group P1 or P-1 excellent in structural stability is particularly preferred because it has an excellent discharge capacity. Specific examples of the crystals are as follows (wherein items noted in each pair of parentheses are, in addition to a general formula normalized to give a value of 2 for the factor of P, a crystal structure and a theoretical capacity).

$Na_4Ni_5(PO_4)_2(P_2O_7)_2 (=Na_{1.33}Ni_{1.67}P_2O_{7.33}$, monoclinic crystal P21/c, theoretical capacity: 116 mAh/g)

$Na_{3.64}Ni_{2.18}(P_2O_7)_2 (=Na_{1.82}Ni_{1.09}P_2O_7$, triclinic crystal P-1, theoretical capacity: 104 mAh/g)

$Na_{3.12}Ni_{2.44}(P_2O_7)_2 (=Na_{1.56}Ni_{1.22}P_2O_7$, triclinic crystal P-1, theoretical capacity: 116 mAh/g)

$Na_{5.6}Ni_4P_8O_{28} (=Na_{1.4}NiP_2O_7$, triclinic crystal P-1, theoretical capacity: 103 mAh/g)

$Na_2NiP_2O_7$ (triclinic crystal P-1, theoretical capacity: 96 mAh/g)

$Na_3Ni_2P_5O_{16} (=Na_{1.2}Ni_{0.8}P_2O_{6.4}$, theoretical capacity: 90 mAh/g)

$NaNi(PO_3)_3 (=Na_{0.67}Ni_{0.67}P_2O_6$, orthorhombic crystal Pcca, theoretical capacity: 84 mAh/g)

$Na_4Ni(PO_3)_6 (=Na_{1.33}Ni_{0.33}P_2O_6$, triclinic crystal P-1, theoretical capacity: 43 mAh/g)

Among them, $Na_{3.64}Ni_{2.18}(P_2O_7)2$, $Na_{3.12}Ni_{2.44}(P_2O_7)_2$, and $Na_2NiP_2O_7$ are preferred because of their excellent discharge capacity, and $Na_{3.64}Ni_{2.18}(P_2O_7)_2$ is particularly preferred because of its high capacity.

The positive electrode active material according to the present invention may be coated or formed into a composite with an electrically conductive carbon. By doing so, the electronic conductivity becomes high and, thus, the rapid charge/discharge characteristics are likely to increase. Examples of the electrically conductive carbon that can be used include highly electrically conductive carbon blacks, such as acetylene black and Ketjenblack, graphite or other carbon powder, and carbon fibers. Preferred among them is acetylene black because of its high electronic conductivity.

An example of a method for coating the positive electrode active material with an electrically conductive carbon is a method of mixing the positive electrode active material with an organic compound which is a source of the electrically conductive carbon and then firing the mixture in an inert or reducing atmosphere to carbonize the organic compound. Any material may be used as the organic compound so long as it can remain as carbon in the process of heat treatment, but glucose, citric acid, ascorbic acid, phenolic resin, a surfactant or the like is preferably used, and a surfactant is particularly preferred because it is easily adsorbable on the surface of the positive electrode active material. The surfactant may be any of a cationic surfactant, an anionic surfactant, an amphoteric surfactant, and a non-ionic surfactant, but a non-ionic surfactant is particularly preferred because of its excellent adsorbability on the surface of the positive electrode active material.

The mixing ratio between the positive electrode active material and the electrically conductive carbon is, in mass ratio, preferably 80-99.5:0.5-20 and more preferably 85-98: 2-15. If the content of the electrically conductive carbon is too small, the electronic conductivity tends to be poor. On the other hand, if the content of the electrically conductive carbon is too large, the content of the positive electrode active material becomes relatively small and, therefore, the discharge capacity tends to decrease.

When the surface of the positive electrode active material is coated with an electrically conductive carbon, the thickness of the electrically conductive carbon coating is preferably 1 to 100 nm and particularly preferably 5 to 80 nm. If the thickness of the electrically conductive carbon coating is too small, the electrically conductive carbon coating is likely to be lost in the process of charging/discharging to deteriorate the battery characteristics. On the other hand, if the thickness of the electrically conductive carbon coating is too large, a decrease in discharge capacity, a voltage drop, and so on are likely to occur.

In the positive electrode active material for a sodium ion secondary battery according to the present invention, the ratio (D/G) of a peak intensity D between 1300 and 1400 $cm^{-1}$ to a peak intensity G between 1550 and 1650 $cm^{-1}$, both measured by Raman spectroscopy, is preferably 1 or less and particularly preferably 0.8 or less, and the ratio (F/G) of a peak intensity F between 800 to 1100 $cm^{-1}$ to the peak intensity G is preferably 0.5 or less and particularly preferably 0.1 or less. When these peak intensity ratios satisfy the above ranges, the electronic conductivity of the positive electrode active material tends to be high.

No particular limitation is placed on the form of the positive electrode active material for a sodium ion secondary battery, but a powdered form is preferred because the number of sites for insertion and extraction of sodium ions is increased. In this case, its average particle diameter is preferably 0.1 to 20 μm, more preferably 0.3 to 15 μm, still more preferably 0.5 to 10 μm, and particularly preferably 0.6 to 5 μm. Furthermore, its maximum particle diameter is preferably 150 μm or less, more preferably 100 μm or less, still more preferably 75 μm or less, and particularly preferably 55 μm or less. If the average particle diameter or maximum particle diameter is too large, the number of sites for insertion and extraction of sodium ions during charge and discharge becomes small and, therefore, the discharge capacity tends to decrease. On the other hand, if the average particle diameter is too small, the dispersed state of powder when the positive electrode active material is produced in paste form tends to be poor, which makes it difficult to produce a uniform electrode.

Herein, the average particle diameter and the maximum particle diameter refer to a median primary particle diameter $D_{50}$ (diameter at 50% cumulative volume) and a median primary particle diameter $D_{99}$ (diameter at 99% cumulative volume), respectively, and are values measured by a laser diffraction particle size distribution measurement device.

The positive electrode active material for a sodium ion secondary battery according to the present invention can be produced, for example, by the solid-state reaction method. Furthermore, if necessary, the resultant positive electrode active material may be given electrical conductivity by adding an electrically conductive carbon thereto and mixing them with grinding. An example of a method for mixing them with grinding is a method in which a general grinder is used, such as a mortar, a mortar mixer, a ball mill, an attritor, a vibrating ball mill, a satellite ball mill, a planetary ball mill, a jet mill or a bead mill. Among them, a planetary ball mill is preferably used. The planetary ball mill has a structure in which a disk rotates while pots on the disk rotate on their own axises, so that very high impact energy can be efficiently produced. Thus, the electrically conductive carbon can be dispersed homogeneously into the positive electrode active material to increase the electronic conductivity.

Moreover, the positive electrode active material may be coated with an electrically conductive carbon by mixing the positive electrode active material with an organic compound which is a source of the electrically conductive carbon and then firing the mixture in an inert or reducing atmosphere to carbonize the organic compound.

(Positive Electrode Material for Sodium Ion Secondary Battery)

A positive electrode material for a sodium ion secondary battery is obtained by mixing the positive electrode active material for a sodium ion secondary battery according to the present invention with a conductive agent, a binder, and so on.

Examples of the conductive agent include highly electrically conductive carbon blacks, such as acetylene black and Ketjenblack, and powdered or fibrous electrically conductive carbons, such as graphite. Preferred among them is acetylene black because it can increase the electrical conductivity even when added in small amount.

The binder is a component to be added to a positive electrode material in order to bind together materials composing the positive electrode material and prevent the positive electrode active material from peeling off the positive electrode due to a volume change during charge and discharge. Specific examples of the binder include thermoplastic straight-chain polymers, such as polytetrafluoroethylene (PTFE), poly(vinylidene fluoride) (PVDF), fluorine-containing rubbers, and styrene-butadiene rubber (SBR); thermosetting resins, such as thermosetting polyimide, polyamide-imide, polyamide, phenolic resin, epoxy resin, urea resin, melamine resin, unsaturated polyester resin, and polyurethane; cellulose derivatives, such as carboxymethyl cellulose (including salts of carboxymethyl cellulose, such as sodium carboxymethyl cellulose, the same applies hereafter), hydroxypropylmethyl cellulose, hydroxypropyl cellulose, hydroxyethyl cellulose, ethyl cellulose, and hydroxymethyl cellulose; and water-soluble polymers, such as polyvinyl alcohol, polyacrylamide, polyvinyl pyrrolidone, and their copolymers. Among them, thermosetting resins, cellulose derivatives, and water-soluble polymers are preferred because of their excellent binding properties and thermosetting polyimide or carboxymethyl cellulose is more preferred because of their industrially widespread use. Particularly, carboxymethyl cellulose is most preferred because it is inexpensive and has such low environmental burden that it does not need any organic solvent for preparation of a paste for electrode formation. These binders may be used singly or in a mixture of two or more of them.

The positive electrode active material for a sodium ion secondary battery according to the present invention has a relatively high operating potential (for example, 5 V) during charge and discharge and is therefore suitable for use in a solid-state sodium ion secondary battery in which a solid electrolyte causing no decomposition due to charge and discharge is used. In using the positive electrode active material for a sodium ion secondary battery according to the present invention in a solid-state sodium-ion secondary battery, a sodium ion-conductive solid electrolyte is preferably added as a component of the positive electrode material for a sodium ion secondary battery. The sodium ion-conductive solid electrolyte is a component that plays a role in conducting sodium ions between a positive electrode and a negative electrode in an all-solid-state secondary battery. The sodium ion-conductive solid electrolyte is preferably beta-alumina or NASICON crystals because they have excellent sodium-ion conductivity. Beta-alumina includes two types of crystals: β-alumina (theoretical composition formula: $Na_2O \cdot 11Al_2O_3$) and β"-alumina (theoretical composition formula: $Na_2O \cdot 5.3Al_2O_3$). Because β"-alumina is a metastable material, it is generally used by adding $Li_2O$ or MgO as a stabilizing agent thereto. Because β"-alumina has a higher sodium-ion conductivity than β-alumina, β"-alumina alone or a mixture of β"-alumina and β-alumina is preferably used and $Li_2O$-stabilized β"-alumina ($Na_{1.6}Li_{0.34}Al_{10.66}O_{17}$) or MgO-stabilized β"-alumina (($Al_{10.32}Mg_{0.68}O_{16}$) ($Na_{1.68}O$)) is more preferably used.

Preferred examples of the NASICON crystal include $Na_3Zr_2Si_2PO_{12}$, $Na_{3.2}Zr_{1.3}Si_{2.2}P_{0.8}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_{2.8}O_9$, $Na_3Zr_{1.88}Y_{0.12}Si_2PO_{12}$, $Na_5YSi_4O_{12}$, $Na_{3.12}Zr_{1.88}Y_{0.12}Si_2PO_{12}$, and $Na_{3.6}Zr_{0.13}Yb_{1.67}Si_{0.11}P_{2.9}O_{12}$ and the particularly preferred is $Na_{3.12}Zr_{1.88}Y_{0.12}Si_2PO_{12}$ because of its excellent sodium-ion conductivity.

The average particle diameter $D_{50}$ of the sodium ion-conductive solid electrolyte is preferably 0.3 to 25 μm, more preferably 0.5 to 20 μm, and particularly preferably 1.2 to 15 μm. If the average particle diameter $D_{50}$ of the sodium ion-conductive solid electrolyte is too small, not only the sodium ion-conductive solid electrolyte becomes difficult to uniformly mix with the positive electrode active material, but also becomes likely to decrease the ion conductivity because it absorbs moisture or becomes carbonated. As a result, the internal resistance tends to increase to decrease the charge/discharge voltage and discharge capacity. On the other hand, if the average particle diameter $D_{50}$ of the sodium ion-conductive solid electrolyte is too large, this significantly inhibits the softening and flow of the positive electrode active material during firing for the formation of a positive electrode layer, so that the resultant positive electrode layer tends to have poor smoothness to decrease the mechanical strength or tends to increase the internal resistance.

The composition of the positive electrode material is preferably appropriately selected depending on the type of electrolyte used. For example, in a sodium ion secondary battery in which an aqueous or nonaqueous liquid electrolyte is used, the positive electrode material preferably contains, in % by mass, 70 to 95% positive electrode active material, 1 to 15% conductive agent, and 3 to 15% binder and more preferably contains 80 to 95% positive electrode active material, 2 to 10% conductive agent, and 3 to 10% binder. If the content of positive electrode active material is too small, the discharge capacity of the sodium ion secondary battery is likely to decrease. If the content of positive electrode active material is too large, the contents of conductive agent and binder become relatively small, so that the electronic conductivity and cycle characteristics are likely to decrease. If the content of conductive agent is too small, the electronic conductivity tends to be poor. If the content of conductive agent is too large, the bindability between the components of the positive electrode material decreases to increase the internal resistance and, therefore, the charge/discharge voltage and discharge capacity tend to decrease. If the content of binder is too small, the bindability between the components of the positive electrode material decreases, so that the cycle characteristics are likely to decrease. If the content of binder is too large, the electronic conductivity decreases and, therefore, the rapid charge/discharge characteristics are likely to decrease.

In the case of a solid-state sodium ion secondary battery in which a sodium ion-conductive solid electrolyte is used as the electrolyte, the positive electrode material preferably contains, in % by mass, 30 to 100% positive electrode active material, 0 to 70% solid electrolyte, and 0 to 20% conductive agent, more preferably contains 34.5 to 94.5% positive electrode active material, 5 to 65% solid electrolyte, and 0.5 to 15% conductive agent, and still more preferably contains 40 to 92% positive electrode active material, 7 to 50% solid electrolyte, and 1 to 10% conductive agent. If the content of positive electrode active material is too small, the discharge capacity of the sodium ion secondary battery is likely to decrease. If the content of conductive agent or solid electrolyte is too large, the bindability between the components of the positive electrode material decreases to increase the internal resistance and, therefore, the charge/discharge voltage and discharge capacity tend to decrease.

The mixing of the components of the positive electrode material can be made using a mixer, such as a planetary centrifugal mixer or a tumbler mixer, or a general grinder, such as a mortar, a mortar mixer, a ball mill, an attritor, a vibrating ball mill, a satellite ball mill, a planetary ball mill, a jet mill or a bead mill. Particularly, the use of a planetary ball mill enables homogeneous dispersion of the components.

The positive electrode material for a sodium ion secondary battery according to the present invention is used as a positive electrode for a sodium ion secondary battery by applying the positive electrode material onto a current collector formed of a metal foil, such as aluminum, copper or gold, and drying it. Alternatively, it is possible to form the positive electrode material for a sodium ion secondary battery according to the present invention into a sheet shape and then form thereon a current collector formed of a metal coating by sputtering, plating or other processes.

(Sodium Ion Secondary Battery) A sodium ion secondary battery according to the present invention includes, in addition to the above positive electrode for a sodium ion secondary battery, a negative electrode as a counter electrode and an electrolyte.

The negative electrode contains a negative electrode active material capable of inserting and extracting sodium ions during charge and discharge. Examples of the negative electrode active material that can be used include metallic materials, such as metallic Na, metallic Sn, metallic Bi, metallic Zn, Sn-Cu alloy, and Bi-Cu alloy, carbon materials, such as hard carbon, and oxide materials containing Ti and/or Nb as an element. Preferred among them are oxide materials containing Ti and/or Nb as an element because they have high safety and are rich as resources. Particularly preferably used are oxide materials containing a crystalline phase represented by $Na_4TiO (PO_4)_2$ or $Na_5Ti (PO_4)_3$ that has a redox potential of 1.5 V or less (vs. $Na/Na^+$) during charge and discharge. In this case, the operating voltage of the sodium ion secondary battery becomes high, so that dendrites of metallic Na can be inhibited from precipitating during repeated charge and discharge.

Examples of the electrolyte that can be used include an aqueous electrolyte, a nonaqueous electrolyte, and a solid electrolyte. Nonaqueous electrolytes or solid electrolytes have wide potential windows and, therefore, produce little gas due to electrolyte decomposition during charge and discharge, so that the safety of the sodium ion secondary battery can be increased. Of these, solid electrolytes are preferred because of their non-flammability.

Aqueous electrolytes contain a water-soluble electrolyte salt. Examples of the electrolyte salt include $NaNO_3$, $Na_2SO_4$, NaOH, NaCl, and $CH_3COONa$. These electrolyte salts may be used singly or in a mixture of two or more of them. The electrolyte salt concentration is appropriately adjusted, generally, within a range of 0.1M to the saturation concentration.

Note that in using an aqueous electrolyte, the redox potential of the positive electrode active material for a sodium ion secondary battery according to the present invention can be used only within the potential window of water.

Nonaqueous electrolytes contain: an organic solvent and/or an ionic liquid both of which are nonaqueous solvents; and an electrolyte salt dissolved in the nonaqueous solvent. No particular limitation is placed on the type of the organic solvent as the nonaqueous solvent, and examples include propylene carbonate (PC), ethylene carbonate (EC), 1,2-dimethoxyethane (DME]) gamma-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), methylethyl carbonate (MEC), and dipropyl carbonate (DPC). These nonaqueous solvents may be used singly or in a mixture of two or more of them. Among them, propylene carbonate is preferred because of its excellent low-temperature characteristics.

No particular limitation is also placed on the type of the ionic liquid so long as it can dissolve an electrolyte salt used, and specific examples include: aliphatic quaternary ammonium salts, such as N,N,N-trimethyl-N-propyl ammonium bis(trifluoromethanesulfonyl)imide [abbr. TMPA-TFSI], N-methyl-N-propylpiperidinium bis(trifluoromethanesulfonyl)imide [abbr. PP13-TFSI], N-methyl-N-propylpyrrolidinium bis(trifluoromethanesulfonyl)imide [abbr. P13-TFSI], and N-methyl-N-butylpyrrolidinium bis(trifluoromethanesulfonyl)imide [abbr. P14-TFSI]; and quaternary alkylimidazolium salts, such as 1-methyl-3-ethylimidazolium tetrafluoroborate [abbr. EMIBF4], 1-methyl-3-ethylimidazolium bis(trifluoromethanesulfonyl)imide [abbr. EMITFSI], 1-allyl-3-ethylimidazolium bromide [abbr. AEImBr], 1-allyl-3-ethylimidazolium tetrafluoroborate [abbr. AEImBF4], 1-allyl-3-ethylimidazoliumbis(trifluoromethanesulfonyl)imide [abbr. AEImTFSI], 1,3-diallylimidazolium bromide [abbr. AAImBr], 1,3-diallylimidazolium tetrafluoroborate [abbr. AAImBF4], and 1,3-diallylimidazolium bis(trifluoromethanesulfonyl)imide [abbr. AAImTFSI].

Examples of the electrolyte salt include sodium salts of $PF_6^-$, $BF_4^-$, $(CF_3SO_2)_2N^-$ (bis (trifluoromethanesulfonyl) amide, commonly called TFSI), $CF_3SO_3$ (commonly called TFS), $(C_2F_5SO_2)_2N$ (bis(pentafluoroethanesulfonyl)amide, commonly called BETI), $ClO_4^-$, $AsF_6^-$, $SbF_6^-$, bis (oxalato) boric acid $(B(C_2O_4)_2^-$, commonly called BOB), and difluoro (trifluoro-2-oxide-2-trifluoro-methyl propipnate(2−)−0,0) boric acid $(BF_2OCOOC(CF_3)_3^-$, commonly called B(HHIB)). These electrolyte salts may be used singly or in a mixture of two or more of them. Particularly preferred are sodium salts of $PF_6^-$ and $BF_4^-$, which are inexpensive. The electrolyte salt concentration is appropriately adjusted, generally, within a range of 0.5M to 3M.

The nonaqueous electrolyte may contain an additive, such as vinylene carbonate (VC), vinylene acetate (VA), vinylene butyrate, vinylene hexanoate, vinylene crotonate or catechol carbonate. These additives serve to form a protective film on the surface of the active material. The concentration of additive is, per 100 parts by mass of nonaqueous electrolyte, preferably 0.1 to 3 parts by mass and particularly preferably 0.5 to 1 part by mass.

Solid electrolytes that can be used are as described previously. Solid electrolytes have wide potential windows as compared to aqueous and nonaqueous electrolytes and, therefore, produce little gas due to decomposition, so that the safety of the sodium ion secondary battery can be increased.

In the case of a sodium ion secondary battery based on an electrolytic solution in which an aqueous electrolyte or a nonaqueous electrolyte is used, a separator is preferably provided between the electrodes. The separator is made of a material having insulation properties and specific examples of the material that can be used include: porous film or non-woven fabric obtained from a polymer, such as polyolefin, cellulose, polyethylene terephthalate or vinylon; non-woven glass fabric containing fibrous glass; glass cloth in which fibrous glass is woven; and film-like glass.

EXAMPLES

Hereinafter, a description will be given in detail of the present invention with reference to its examples, but the present invention is not at all limited by the following examples.

Tables 1 and 2 show examples (Nos. 1 to 4 and 6 to 8) and a comparative example (No. 5).

TABLE 1

|  |  | 1 | 2 | 3 | 4 | 5 |
|---|---|---|---|---|---|---|
| Composition (% by mole) | $Na_2O$ | 20 | 30.3 | 33 | 16.7 | 28.6 |
|  | NiO | 50 | 36.4 | 33 | 33.3 | 42.8 |
|  | $P_2O_5$ | 30 | 33.3 | 33 | 50 | 28.6 |
| Type of Precipitated Crystal |  | $Na_4Ni_5(PO_4)_2(P_2O_7)_2$ [$Na_{1.33}Ni_{1.67}P_2O_{7.33}$] | $Na_{3.64}Ni_{2.18}(P_2O_7)_2$ [$Na_{1.82}Ni_{1.39}P_2O_7$] | $Na_2NiP_2O_7$ | $NaNi(PO_3)_3$ [$Na_{0.67}Ni_{0.67}P_2O_6$] | $Na_4Ni_3(PO_4)_2(P_2O_7)$ [$Na_2Ni_5P_2O_{7.5}$] |
| Discharge Capacity (mAh/g) | Electrolyte Solution-Based Battery | 32 | 38 | 34 | 33 | 21 |
|  | All-Solid-State Battery | 28 | 41 | 43 | Not measured | 13 |

* Characters in [ ] represent a general formula normalized to give 2 for the factor of P.

TABLE 2

| | | 6 | 7 | 8 |
|---|---|---|---|---|
| Composition (% by mole) | $Na_2O$ | 30 | 33 | 30 |
| | NiO | 27 | 25 | 33 |
| | MnO | 10 | | |
| | FeO | | 9 | |
| | CoO | | | 4 |
| | $P_2O_5$ | 33 | 33 | 33 |
| Type of Precipitated Crystal | | $Na_{3.64})Ni_{0.75}Mn_{0.25})_{2.18}(P_2O_7)_2$ $[Na_{1.92}(Ni_{0.75}/Mn_{0.25})_{1.09}P_2O_7]$ | $Na_2(Ni_{0.75}Fe_{0.25})P_2O_7$ | $Na_{3.64}(Ni_{0.9}Co_{0.1})_{2.18}(P_2O_7)_2$ $[Na_{1.82}(Ni_{0.9}/Co_{0.1})_{1.09}P_2O_7]$ |
| Discharge Capacity (mAh/g) | All-Solid-State Battery | 44 | 51 | 47 |

* Characters in [ ] represent a general formula normalized to give 2 for the factor of P.

Electrolytic Solution-Based Sodium Ion Secondary Battery (1) Production of Positive Electrode Active Material Sodium carbonate, sodium metaphosphate, nickel oxide, and orthophosphoric acid were weighed to give each composition described in Nos. 1 to 5 of Table 1, thus preparing a raw material batch. The raw material batch was mixed in ethanol using a planetary ball mill and then dried at 100° C. The dried raw material batch was calcined in an electric furnace at 900° C. for six hours and thus degassed. The calcined raw material batch was pressed into a shape at a pressure of 500 kgf/cm² and then fired in an air atmosphere at 800° C. for 12 hours to induce a solid-state reaction. The obtained solid-state reactant was ground for 12 hours with a ball mill using a 20-mm diameter $ZrO_2$ ball and the ground product was air-classified to obtain a powdered solid-state reactant having an average particle diameter $D_{50}$ of 2 μm.

An amount of 100 parts by mass of powdered solid-state reactant obtained in the above process was mixed well with 21.4 parts by mass (corresponding to 12 parts by mass in carbon terms) of polyethylene oxide nonylphenyl ether (HLB value: 13.3, weight average molecular weight: 660), which is a non-ionic surfactant, as a carbon source and 10 parts by mass of ethanol, followed by drying at 100° C. for about an hour. Thereafter, the mixture was fired in a nitrogen atmosphere at 650° C. for an hour to carbonize the non-ionic surfactant, thus obtaining positive electrode active material powder the surface of which was coated with carbon.

The obtained positive electrode active material powder was subjected to powder X-ray diffraction measurement and Rietveld analysis to identify its crystal structure.

(2) Production of Positive Electrode for Electrolytic Solution-Based Battery

Acetylene black (Super C65 manufactured by Timcal) as a conductive agent and poly (vinylidene fluoride) as a binder were weighed and mixed with the positive electrode active material powder obtained in the above process to give a ratio of positive electrode active material powder to conductive agent to binder of 90:5:5 (mass ratio) and the mixture was dispersed into N-methylpyrrolidinone, followed by well stirring with a planetary centrifugal mixer to form a slurry, thus obtaining a positive electrode material.

Next, the obtained positive electrode material was coated on a 20-μm thick aluminum foil serving as a positive electrode current collector using a doctor blade with a gap of 125 μm, and the aluminum foil with the positive electrode material was vacuum-dried by a dryer at 70° C. and then pressed by passing it between a pair of rotating rollers to obtain an electrode sheet. This electrode sheet was punched out into an 11-mm diameter disc by an electrode cutting machine and dried at a temperature of 150° C. for eight hours under reduced pressure, thus obtaining a circular positive electrode.

(3) Production of Test Battery

The positive electrode obtained in the above process was placed, with its aluminum foil surface down, on a lower lid of a coin cell, and a separator formed of a 16-mm diameter polypropylene porous film dried at 70° C. for eight hours under reduced pressure, a metallic sodium layer as a counter electrode, and an upper lid of the coin cell were laid one after another on the positive electrode, thus producing a test battery. A 1M $NaPF_6$ solution/EC:DEC=1:1 (where EC is ethylene carbonate and DEC is diethyl carbonate) was used as an electrolytic solution. The assembly of the test battery was conducted in an environment of a dew-point of minus 70° C. or below.

(4) Charge and Discharge Test

The test battery was CC (constant-current) charged at 30° C. from an open circuit voltage to 5.2 V and its amount of electricity charged to the positive electrode active material per unit mass (first charge capacity) was determined. Next, the test battery was CC discharged from 5.2 V to 2 V and its amount of electricity discharged from the positive electrode active material per unit mass (first discharge capacity) was determined. The C rate was 0.1 C. The results are shown in Table 1.

As shown in Table 1, Nos. 1 to 4 as examples exhibited discharge capacities of 32 to 38 mAh/g, whereas No. 5 as a comparative example exhibited a poorer discharge capacity of 21 mAh/g.

All-Solid-State Sodium Ion Secondary Battery (1) Production of Positive Electrode Active Material As for Nos. 1 to 3 and 5 of Table 1, the positive electrode active material powder produced in the above process was used. As for Nos. 6 to 8 of Table 2, positive electrode active material powder was produced in the same process as in Nos. 1 to 3 and 5 except that some of sodium carbonate, sodium metaphosphate, nickel oxide, manganese oxide, iron oxide, cobalt oxide, and orthophosphoric acid were appropriately selected and weighed to give each composition described in Table 2, thus preparing a raw material batch.

(2) Preparation of Sodium Ion-Conductive Solid Electrolyte

A bulk $Li_2O$-stabilized β″-alumina represented by a composition formula $Na_{1.6}Li_{0.34}Al_{10.66}O_{17}$ (manufactured by Ionotec Ltd.) was processed by dry grinding to a thickness of 0.2 mm, thus obtaining a solid electrolyte sheet. Furthermore, solid electrolyte powder (having an average particle diameter $D_{50}$=1.5 μm) was separately prepared by grinding the bulk $Li_2O$-stabilized β″-alumina with a planetary ball mill and passing the ground product through a sieve with 10-μm openings.

(3) Production of Test Battery

The positive electrode active material powder and solid electrolyte powder obtained in the above processes, and acetylene black (Super C65 manufactured by Timcal) as a conductive agent were weighed in a ratio of 72:25:3 and mixed for 30 minutes using an agate mortar and a pestle. Added to 100 parts by mass of the obtained mixed powder were 15 parts by mass of polypropylene carbonate and additionally 30 parts by mass of N-methylpyrrolidinone. The mixture was stirred well with a planetary centrifugal mixer to form a slurry.

The obtained slurry was applied, with an area of 1 cm$^2$ and a thickness of 70 μm, to one side of the solid electrolyte sheet obtained in the above process and then dried at 70° C. for three hours. Thereafter, the slurry on the solid electrolyte sheet was calcined by holding it in nitrogen at 350° C. for an hour. Then, the product on the solid electrolyte sheet was fired under conditions at 650° C. and 50 MPa for 10 minutes in Ar using a hot isostatic pressure apparatus, thus forming a sintered body of a positive electrode material (a positive electrode layer) on the surface of the solid electrolyte sheet.

When the powder X-ray diffraction patterns of the materials making up each of the positive electrode layers were checked, diffraction lines originating from the crystals described in Tables 1 and 2 were confirmed. Furthermore, regarding all the positive electrode layers, respective crystalline diffraction lines originating from the solid electrolyte powders used were confirmed.

Next, a current collector formed of a 300-nm thick gold electrode was formed on the surface of the positive electrode layer using a sputtering device (SC-701AT manufactured by Sanyu Electron Co., Ltd.). Furthermore, in an argon atmosphere of the dew point of minus 70° C. or below, metallic sodium serving as a counter electrode was pressure-bonded to the surface of the solid electrolyte layer opposite to the surface thereof on which the positive electrode layer was formed. The obtained laminate was placed on a lower lid of a coin cell and covered with an upper lid to produce a CR2032-type test battery.

(4) Charge and Discharge Test

The produced test battery was CC (constant-current) charged at 60° C. from an open circuit voltage to 5.2 V and its amount of electricity charged to the positive electrode active material per unit mass (first charge capacity) was determined. Next, the test battery was CC discharged from 5.2 V to 2 V and its amount of electricity discharged from the positive electrode active material per unit mass (first discharge capacity) was determined. In this test, the C rate was 0.01 C. The results are shown in Tables 1 and 2.

As shown in Tables 1 and 2, Nos. 1 to 3 and 6 to 8 as examples exhibited discharge capacities of 28 to 51 mAh/g, whereas No. 5 as a comparative example exhibited a poorer discharge capacity of 13 mAh/g.

INDUSTRIAL APPLICABILITY

The positive electrode active material for a sodium ion secondary battery according to the present invention is suitable for sodium ion secondary batteries used in portable electronic devices, electric vehicles, electric power tools, backup emergency power supplies, and so on.

The invention claimed is:

1. A positive electrode active material for a sodium ion secondary battery, the positive electrode active material being composed of crystals represented by a general formula $Na_x(Ni_{1-a}M_a)_yP_2O_z$ where M represents at least one transition metal element selected from the group consisting of Cr, Mn, and Co and the following are satisfied: $0.6 \leq x \leq 4$, $0.3 \leq y \leq 1.3$, $0 \leq a \leq 0.9$, and $6 \leq z < 7.5$).

2. The positive electrode active material according to claim 1, wherein the crystals have a structure belonging to a triclinic space group P-1.

3. The positive electrode active material according to claim 1, wherein the crystals have a structure belonging to an orthorhombic space group Pcca.

4. A positive electrode comprising the positive electrode active material according to claim 1.

5. The positive electrode according to claim 4, further comprising a sodium ion-conductive solid electrolyte.

6. The positive electrode according to claim 5, wherein the sodium ion-conductive solid electrolyte contains beta-alumina or NASICON crystals.

7. The positive electrode material according to claim 4 comprising 30 to 100 mass % of the positive electrode active material, 0 to 70 mass % of a sodium ion-conductive solid electrolyte, and 0 to 20 mass % of a conductive agent.

8. A sodium ion secondary battery comprising the positive electrode according to claim 4.

\* \* \* \* \*